United States Patent [19]
Betschart et al.

[11] 3,763,661
[45] Oct. 9, 1973

[54] INDEPENDENT MOLD FROZEN CONFECTION MACHINE

[75] Inventors: Robert J. Betschart; John S. Brown, both of Sacramento, Calif.

[73] Assignee: FMC Corporation, San Jose, Calif.

[22] Filed: Dec. 23, 1971

[21] Appl. No.: 211,267

[52] U.S. Cl.................... 62/345, 62/380, 425/261, 425/243
[51] Int. Cl............................ F25c 1/08, F25c 1/22
[58] Field of Search........................ 62/345, 73, 353, 62/380, 382; 425/261, 436, 243

[56] References Cited
UNITED STATES PATENTS

| | | | |
|---|---|---|---|
| 2,884,875 | 5/1959 | Rasmusson | 62/345 X |
| 2,700,347 | 1/1955 | Gram et al. | 62/345 X |
| 3,488,976 | 1/1970 | Hirahara et al. | 62/345 X |
| 2,894,652 | 7/1959 | Glass | 62/345 |

Primary Examiner—William E. Wayner
Attorney—F. W. Anderson et al.

[57] ABSTRACT

A frozen confection machine has multiple molds which are not connected to side chains. The molds are advanced at various spacings in an interrupted or stepwise motion from a filling station, through a freezing tank wherein the confection in the molds is frozen, through an extractor section where the molds are defrosted and the frozen confection is moved by means of extractor bars. Thereafter, the molds are lowered independently, inverted and passed through a wash section at increased spacings, prior to return to the filling station. The use of independent molds permits a substantial reduction in the number of molds required, because since the molds are independent, the mold spacings can be increased during mold return operations outside of the freezing tank.

8 Claims, 19 Drawing Figures

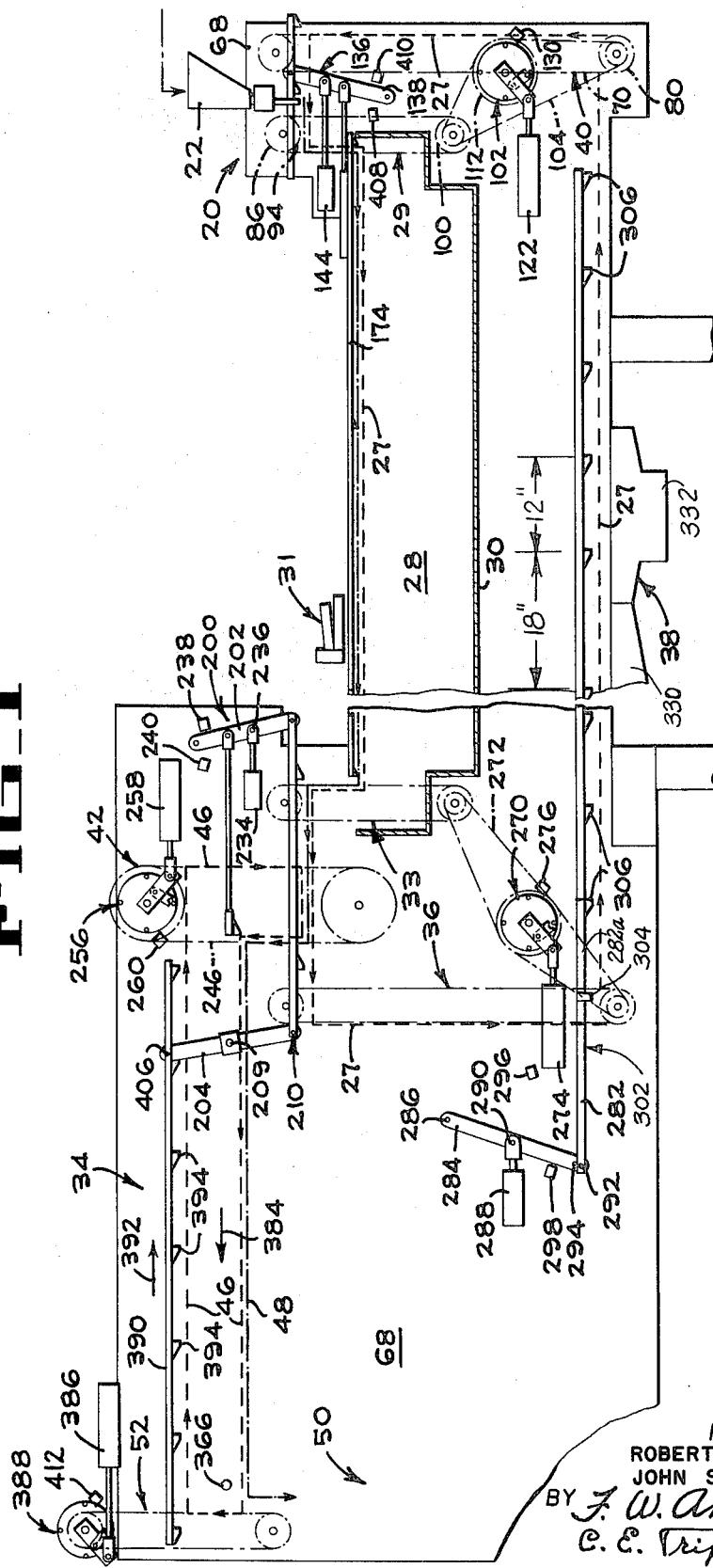

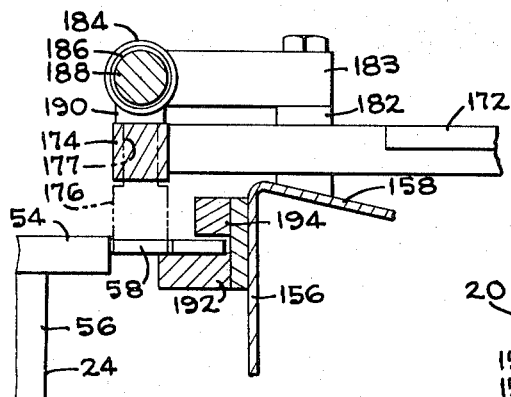
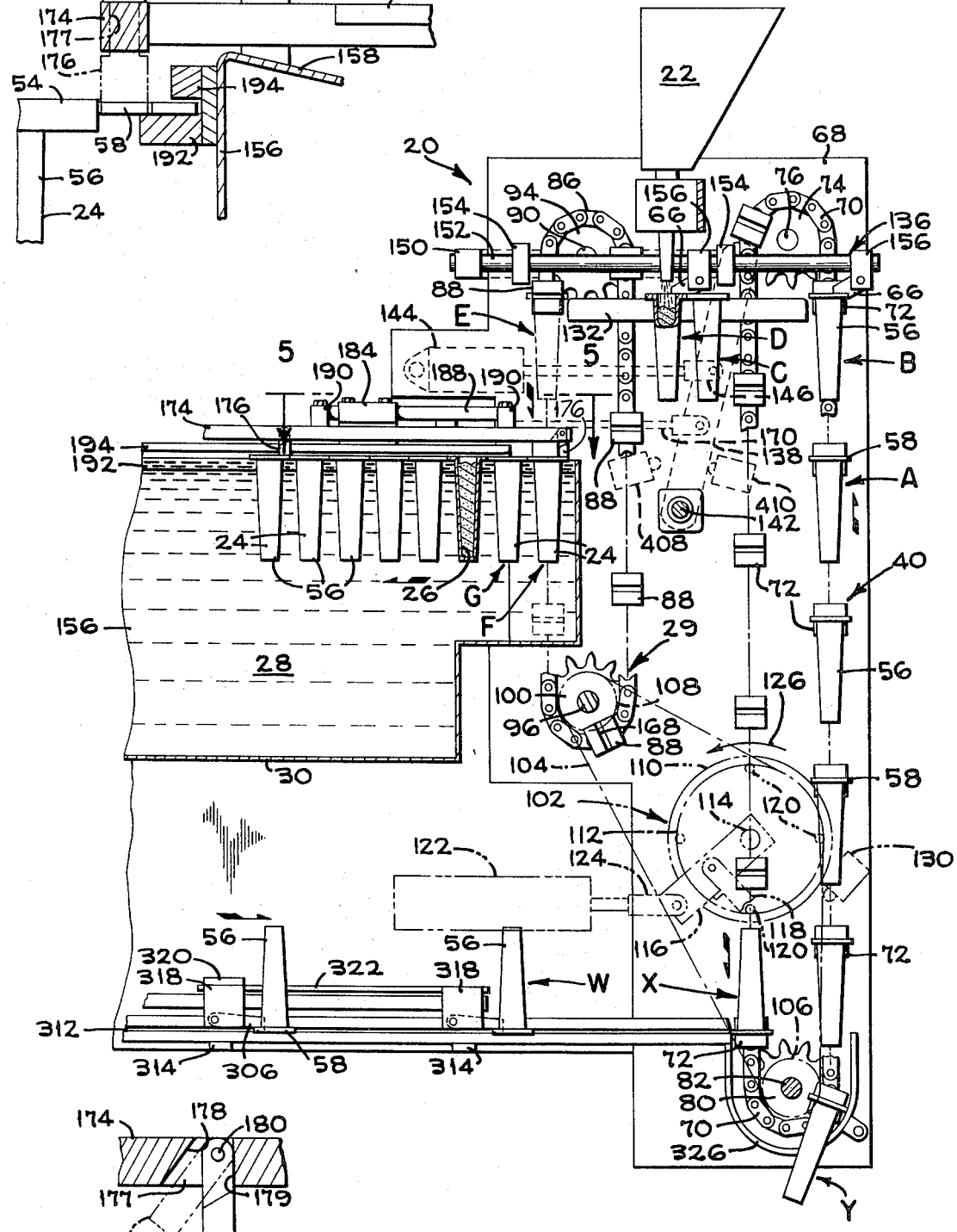

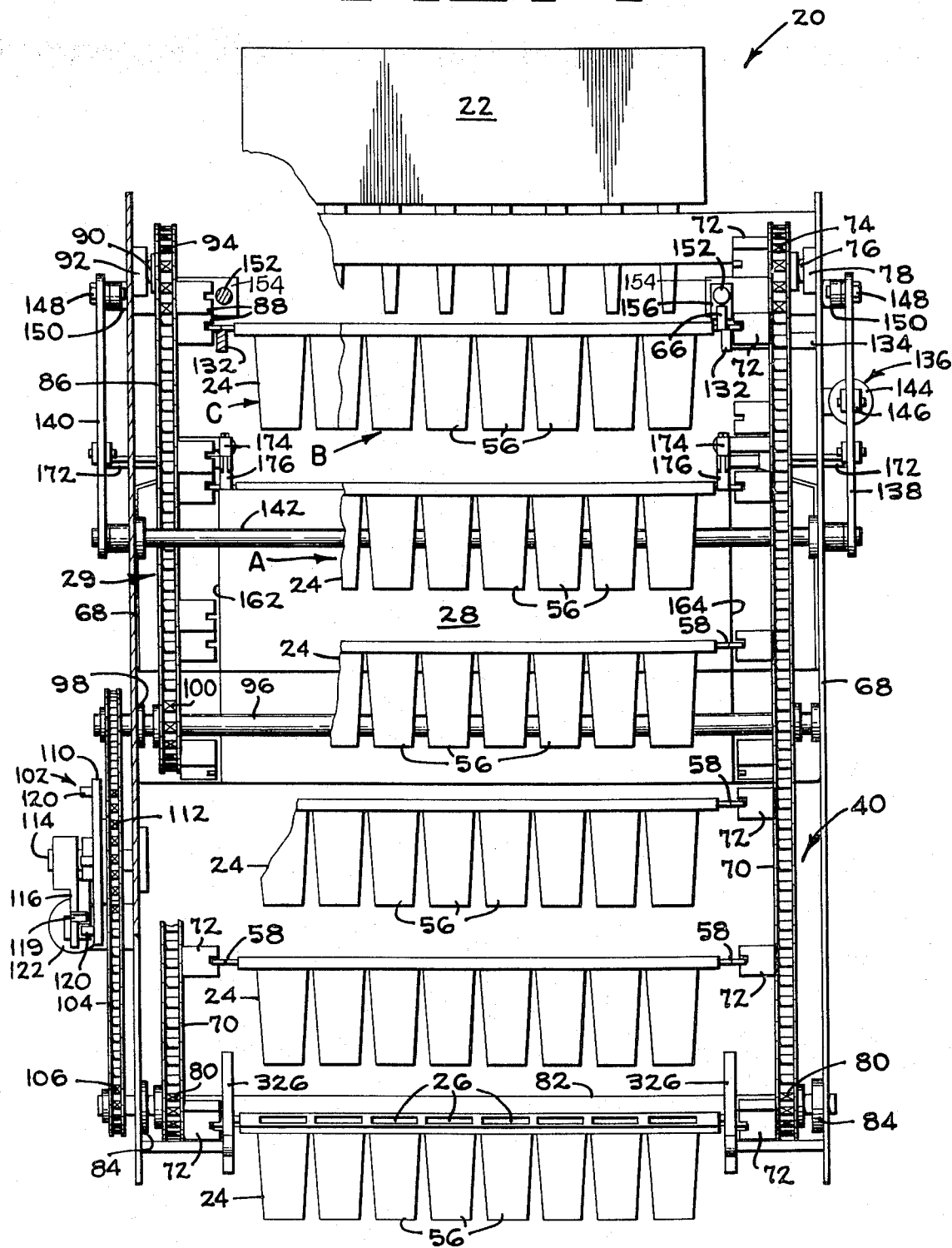

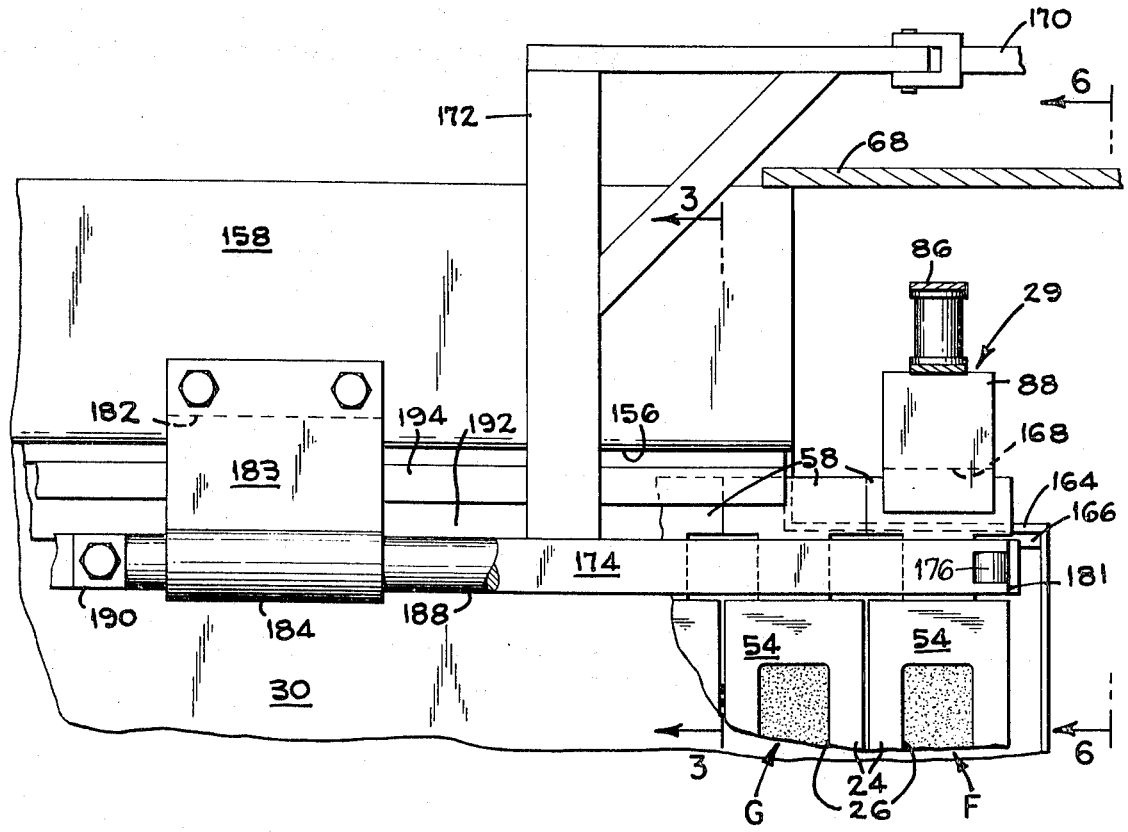
FIG_5
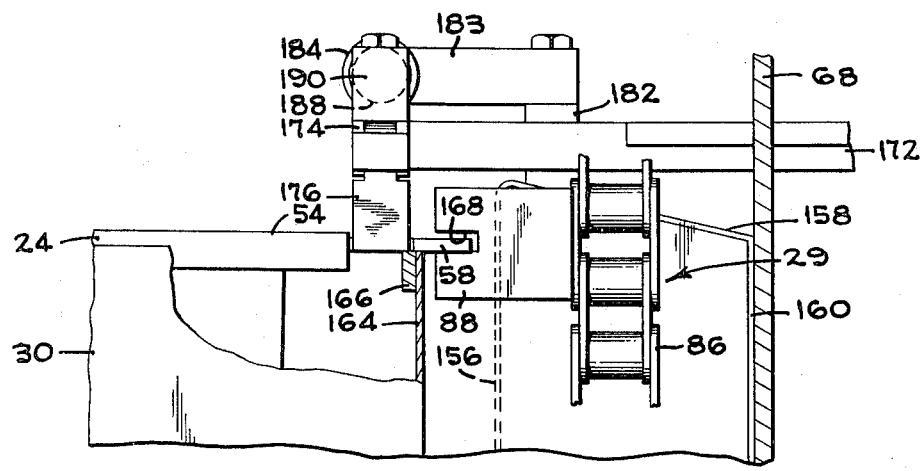
FIG_6

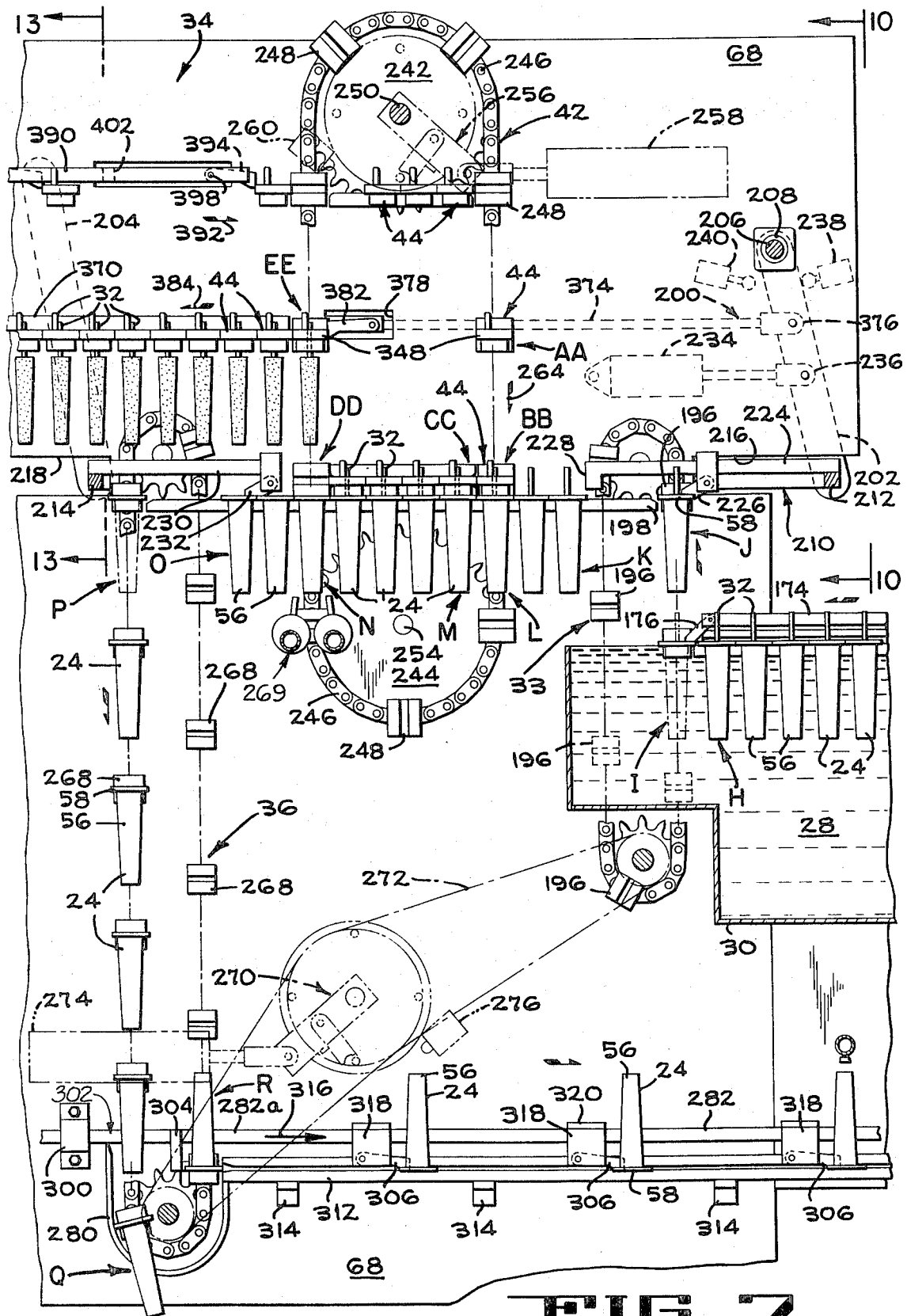
FIG_7

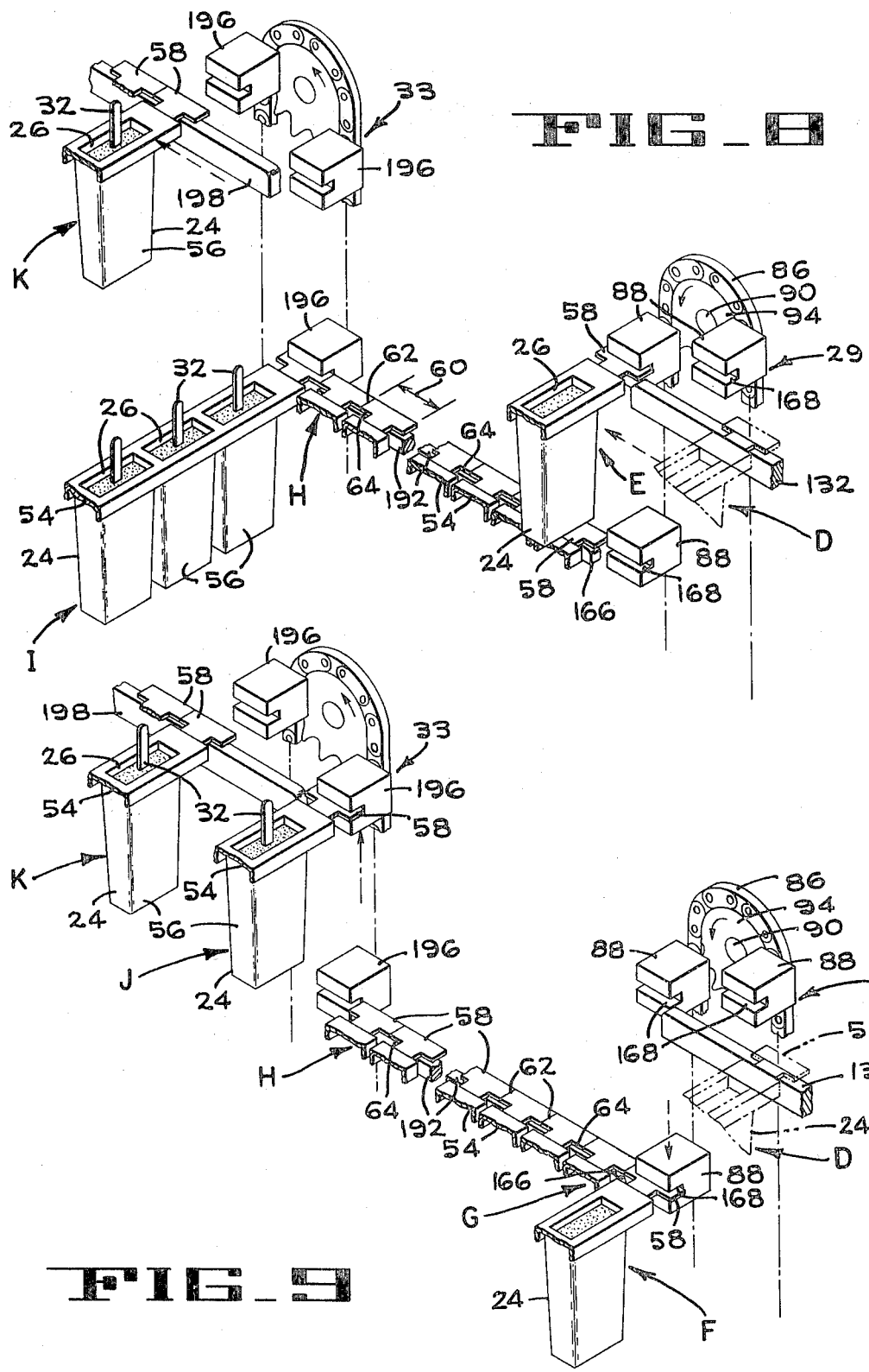

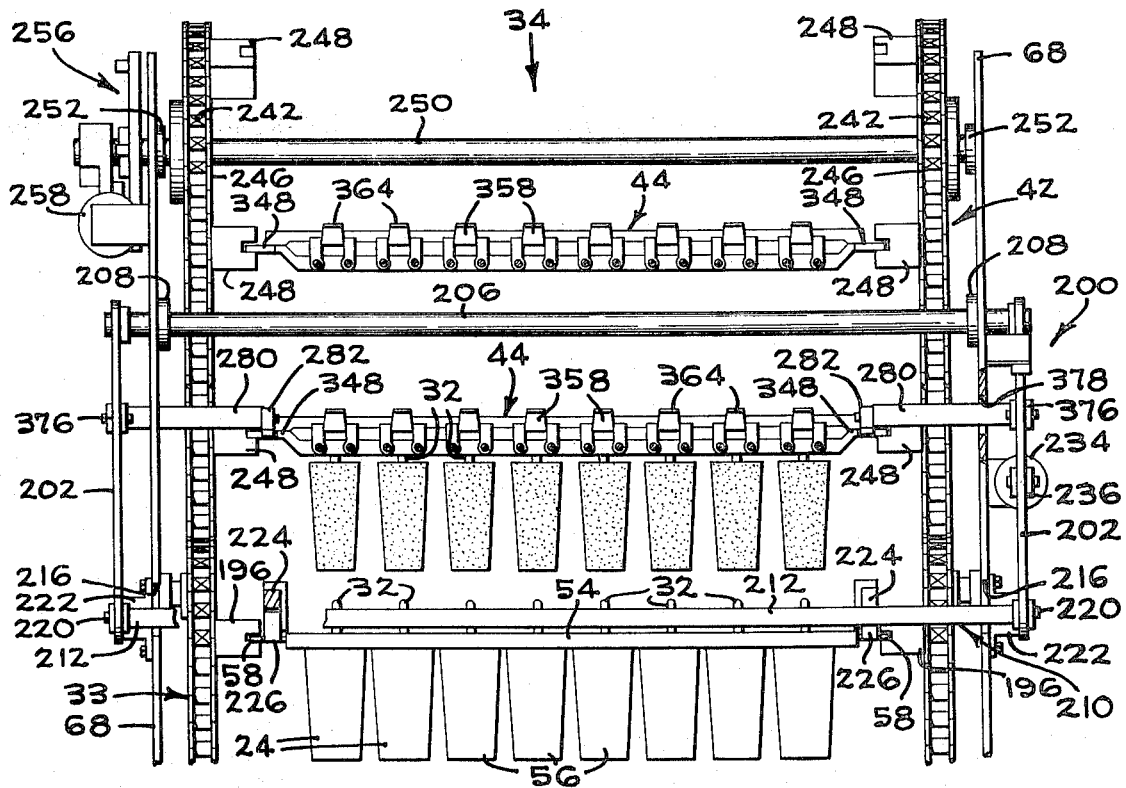
FIG_10
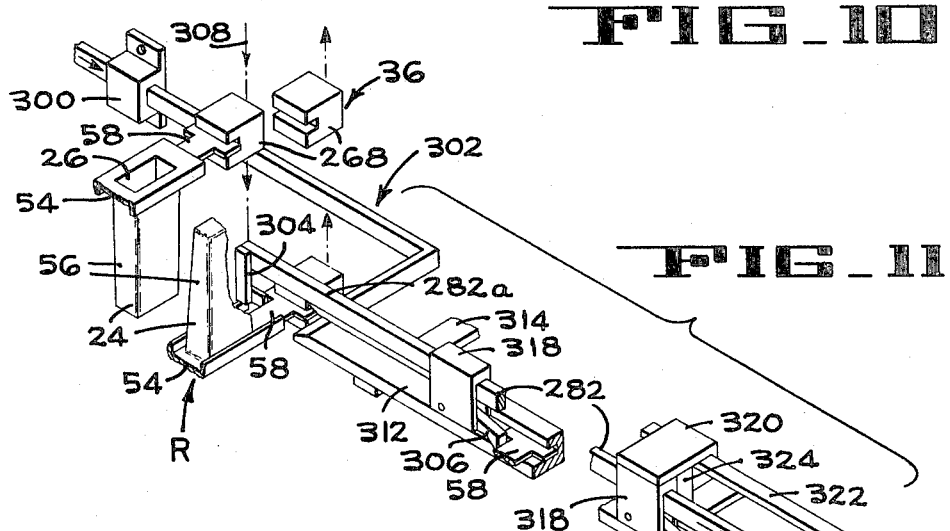
FIG_11
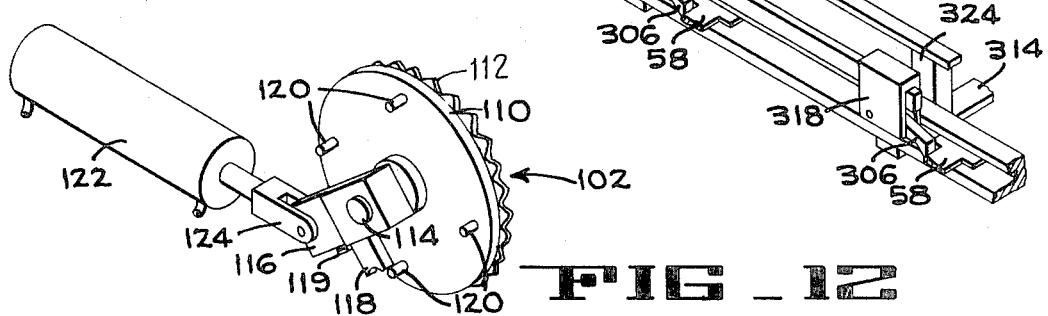
FIG_12

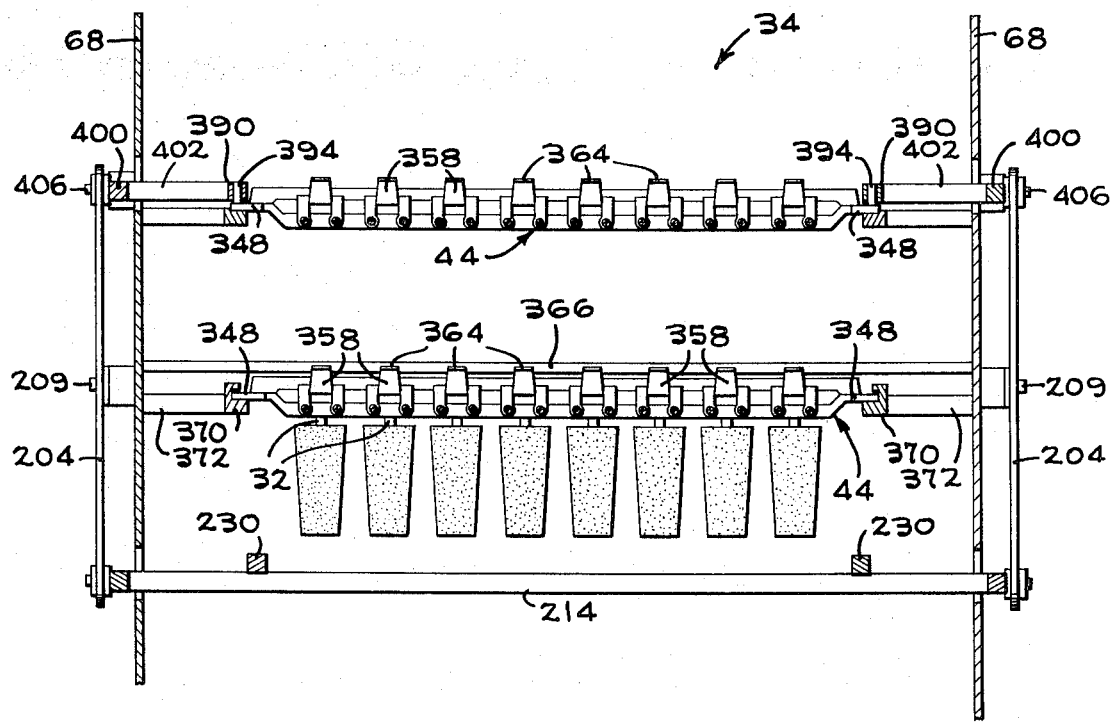
FIG_13
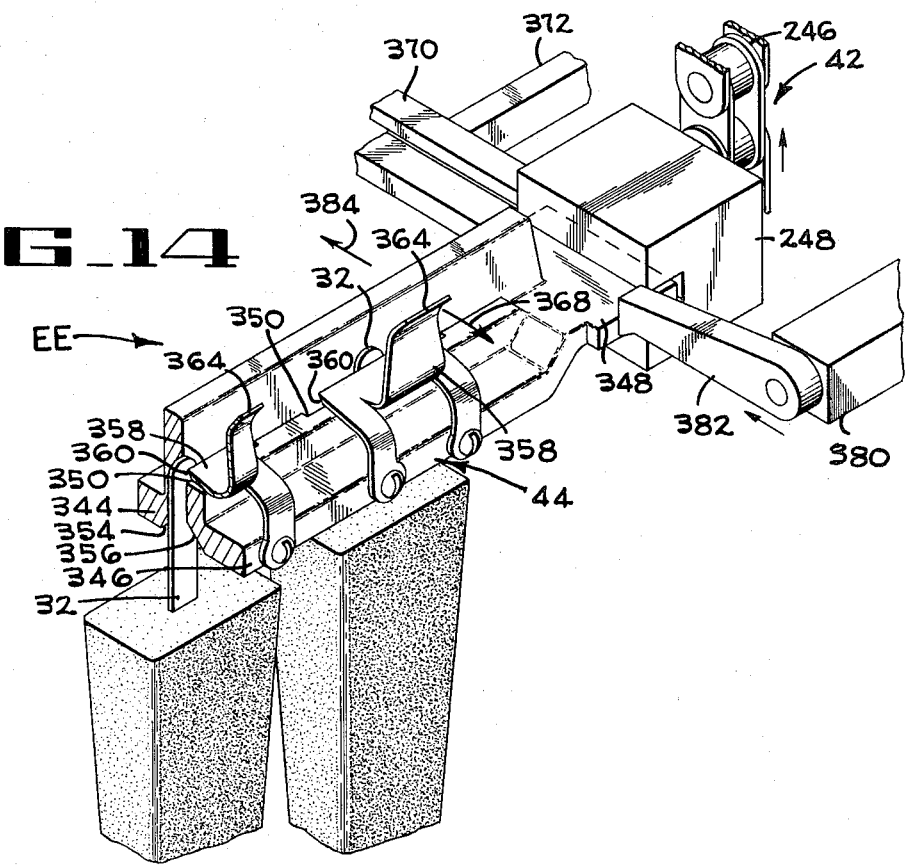
FIG_14

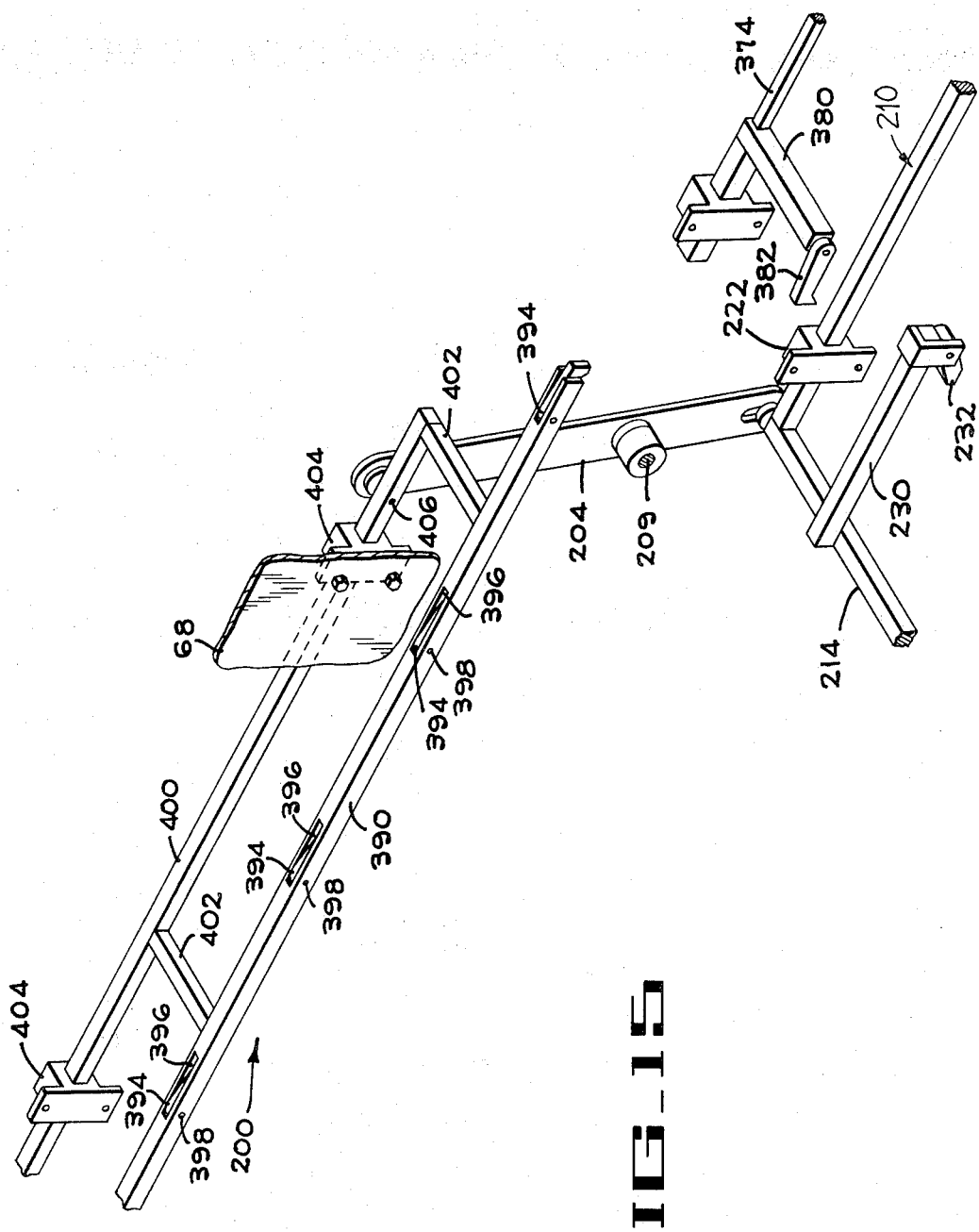
FIG_15

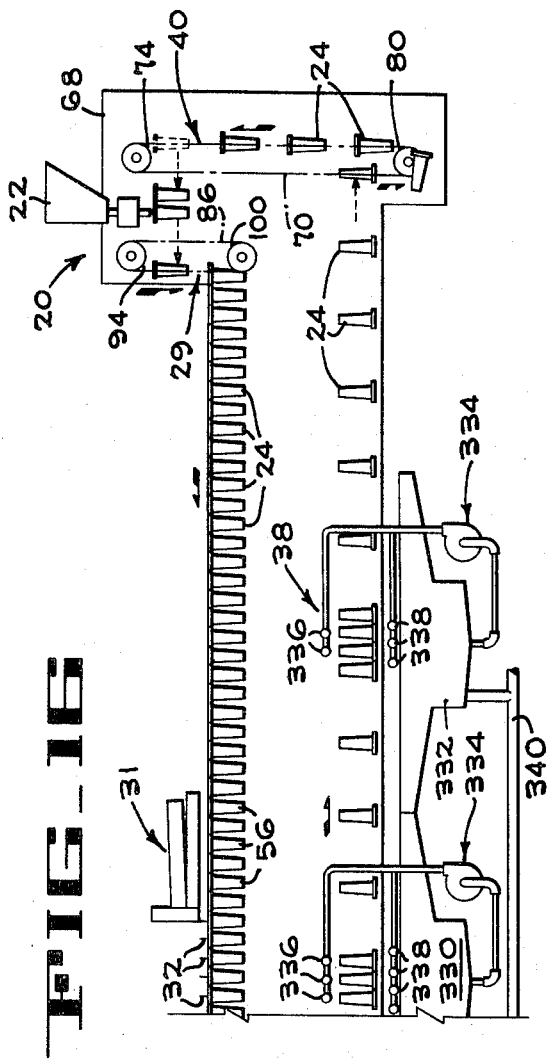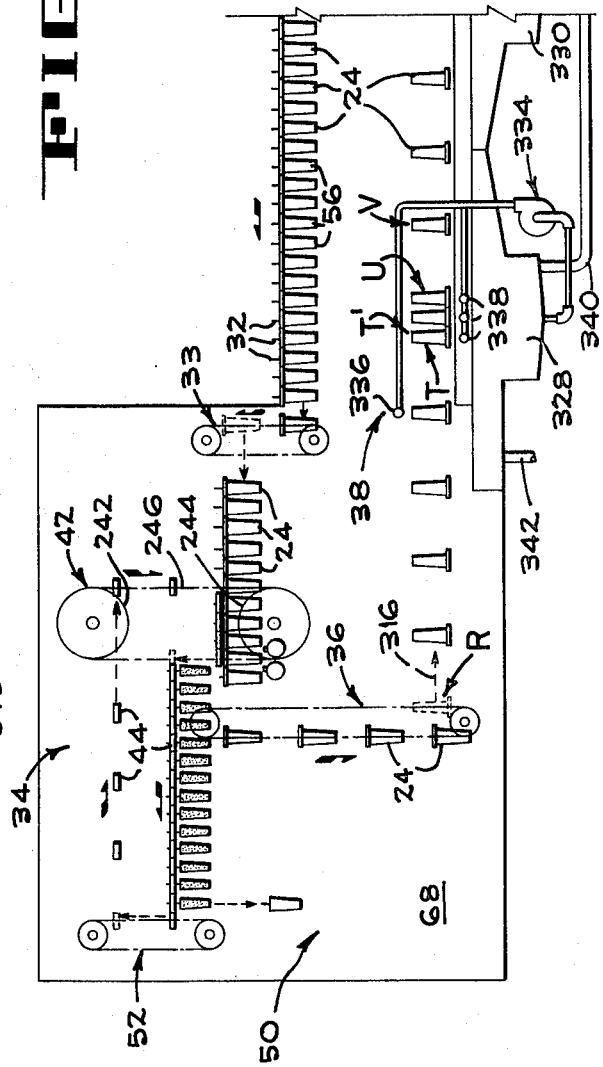

INDEPENDENT MOLD FROZEN CONFECTION MACHINE

BACKGROUND OF THE INVENTION

1. Field of the Invention

The present invention concerns a frozen confection machine in which the product is frozen in single or multiple cavity molds.

2. Description of the Prior Art

This invention is an improvement over the frozen confection machines presently employed in the art, such as that shown in the Rasmusson U.S. Pat. No. 3,031,978, issued May 1, 1962. These machines employ a large number of single or multiple cavity molds that are advanced and carried between a pair of side chains driven by sprockets at either end of the machine. The molds are attached to these chains at a uniform spacing around the entire loop of the chains.

SUMMARY OF THE INVENTION

Due to the demand for increased numbers of different sized and shaped frozen confection products, producers often must acquire several different sets of molds for their confection machines. Since the cost of each mold may vary from approximately $19 to $105, depending upon complexity, and the fact that the machines generally employ over 300 molds, any significant reduction in the number of molds employed in the machine represents a considerable cost savings at the original purchase of the machine, as well as further substantial savings when additional sets of molds are acquired.

The object, therefore, of the present invention is to effect a substantial cost savings by substantially reducing the number of molds required. This object is achieved by supporting the molds for independent movement in horizontal directions on guide rails and advancing the molds directly by the action of pusher mechanisms with mold engaging dogs, or indirectly by edge to edge engagement of one or more molds, only one mold being driven by a pusher. This enables the spacing of the molds to be varied when they are moved in horizontal directions, for example, from an edge to edge abutment in the freezing tank to approximately a 12 inch spacing in the wash section, the latter representing a reduction in the number of molds required. A further mold reduction is obtained by maintaining approximately an 8 inch spacing between the mold carrying yokes on the mold elevators and lowerators. If the molds were mounted on chains, as in prior devices, the relatively close spacing of the molds would be maintained throughout the entire cycle, the result being that more molds are required in prior machines than in the machine of the present invention.

A further object of the invention is to reduce the number of extractor bars required to further reduce machine costs. To this end an extractor bar return mechanism is employed having widely spaced pushers and a long stroke pusher mechanism similar to the mold return section.

Another object of the invention is to provide longer wash and rinse times as the molds move through the wash section.

These and other objects of the invention will become more apparent in the description of the preferred embodiment.

DESCRIPTION OF THE DRAWINGS

FIG. 1 is a schematic side view of the frozen confection machine of the present invention showing the mold, product and extractor movement paths as well as the advancing, elevating and lowering mechanisms.

FIG. 2 is a central longitudinal section of the filler section.

FIG. 3 is a partial enlarged section taken on line 3—3 of FIG. 5.

FIG. 3A is an enlarged view of the pusher dog mounting having portions broken away.

FIG. 4 is an end view of the filler section having portions broken away.

FIG. 5 is a plan view taken on line 5—5 of FIG. 2.

FIG. 6 is an enlarged section taken on line 6—6 of FIG. 5.

FIG. 7 is an enlarged central longitudinal section of the extractor section.

FIG. 8 is an enlarged operational perspective of the filled mold lowerator and elevator.

FIG. 9 is a view similar to FIG. 8, advanced one step in operation.

FIG. 10 is a cross sectional view of the extractor section taken on line 10—10 of FIG. 7.

FIG. 11 is an enlarged partial perspective view of the mold return mechanism.

FIG. 12 is an enlarged perspective view of the ratchet drive mechanism.

FIG. 13 is a cross sectional view taken on line 13—13 of FIG. 7.

FIG. 14 is an enlarged partial perspective view of an extractor bar and its advancing mechanism.

FIG. 15 is a fragmentary perspective view of the mold and extractor bar advancing mechanism.

FIG. 16 and 16A are schematic side views showing the mold, product and extractor bar spacing during operation.

DESCRIPTION OF THE PREFERRED EMBODIMENT

INTRODUCTION

Figure 17:
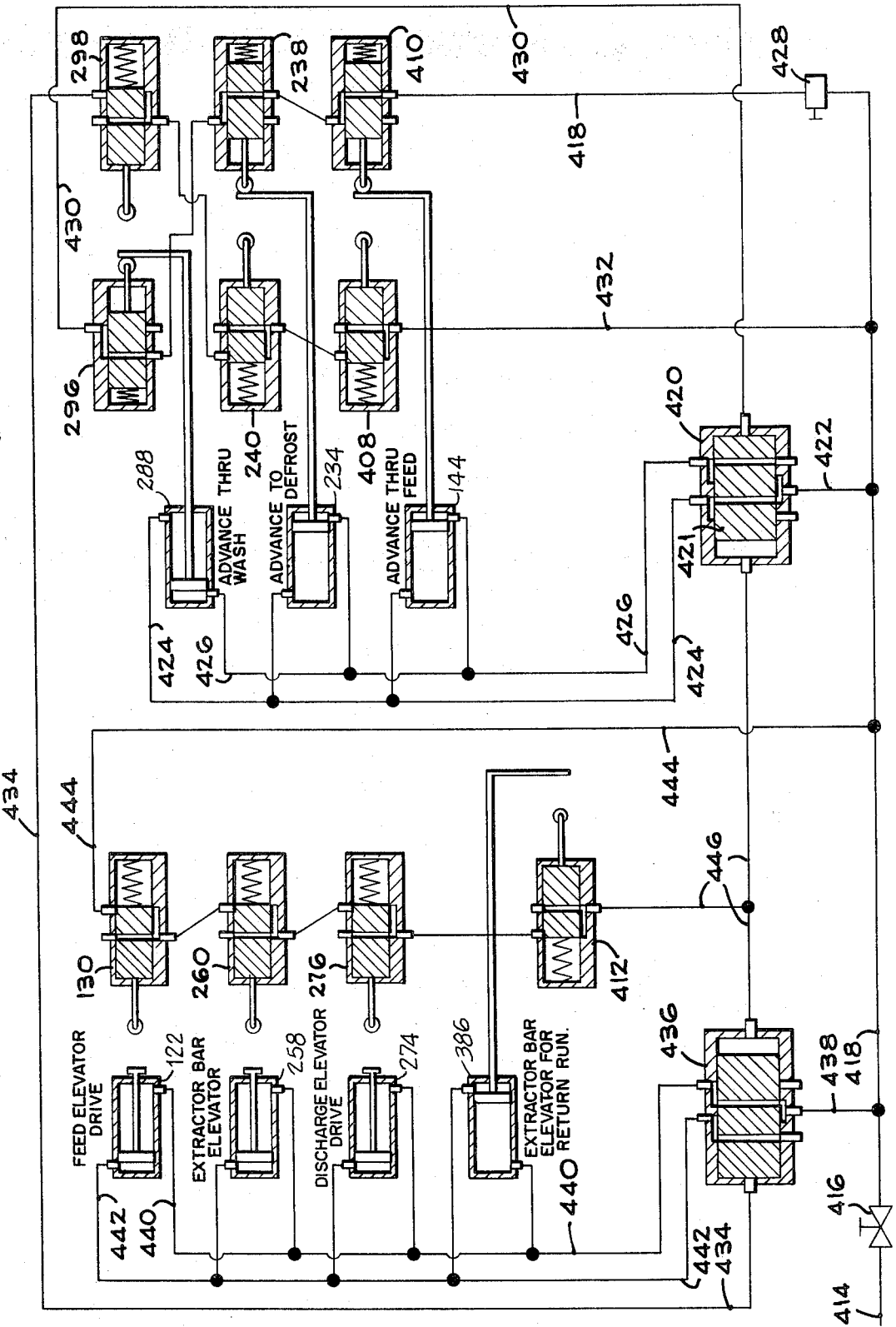
FIG. 17 is a schematic of the pneumatic system.

Referring to FIG. 1, the frozen confection machine of the present invention comprises a filler section 20 including a filler 22 at which molds 24 having multiple cavities 26 (FIG. 8) are filled with a liquid products. The path of the molds 24 through the machine is shown by a dashed line 27. From the filler 22, the molds are advanced and then lowered into a freezing section 28 by a lowerator 29. The freezing section includes a low temperature brine tank 30. A stick inserter 31 of the general type disclosed in U.S. Pat. No. 2,953,105 issued on Sept. 20, 1960 is located over the brine tank 30 for inserting sticks 32 (FIG. 1) into the partially frozen confection. As the molds 24 advance through the brine tank, the liquid product solidifies and is frozen solid when the end of the tank is reached.

At the end of the freezing section, the molds are lifted from the brine tank 30 by an elevator 33 and advanced to an extractor section 34 in which the molds are defrosted and the frozen product is extracted upwardly. The molds as shown by line 27 advance to an empty mold lowerator, shown generally at 36, where they are lowered and inverted, thereafter passing into a wash section 38 beneath the freezing section 28. Here the molds are washed and rinsed for reuse. At the end of the wash section the molds are re-inverted and raised to the filler 22 by means of an empty mold elevator 40 in the filler section 20.

In the extractor section 34, an extractor bar lowerator-elevator 42 is employed to lower extractor bars 44 over the ends of the sticks protruding from the frozen product (FIGS. 7 and 14), their path being indicated by dashed line 46 in FIG. 1. As the molds are defrosted, the molds and extractor bars advance together until the upward run of the extractor bar lowerator-elevator 42 raises the extractor bar and withdraws the product from the molds. The extractor bar and frozen product (dashed lines 46 and 48) then advance together toward a bagging station 50 where the frozen product is released. Intermediate the extractor section and the bagging station 50, provision may be made for additional processes such as a chocolate dip by means well known in the art. From the baggins station 50, the extractor bars are raised to the return run of path 46 to the extractor section 34 by means of an extractor bar elevator 52.

It will be noted that all horizontal advancing movement of the molds 24, the frozen product, and extractor bars 44 is accomplished substantially simultaneously in an intermittent step-wise fashion. Likewise, all vertical motion of the same elements, when carried by the various chain drive elevators and lowerators is also intermittent, step-wise and substantially simultaneous. The vertical motions occur during the dwell period of the horizontal motions.

PRODUCT MOLDS

The product molds 24 are best seen in FIGS. 8 and 9. Each of the molds 24 comprises a channel shaped bar 54 that extends transversely across the machine and includes multiple pockets 56 for defining cavities 26. Each end of mold bar 54 (only one side being shown in FIGS. 8 and 9) has a T-shaped projection 58 for slidably supporting the molds from guide rails or ways. These projections 58 are wider, as indicated at 60 (FIG. 8) than the mold bars 54 in order to provide spacing between the molds 24. Furthermore, adjacent T-shaped projections 58 abut each other in a fore-aft relation as at 62 so that when one mold is pushed forwardly the molds in front of it are also pushed forward. The adjacent abutting projections 58 form notches 64 for receiving a pusher dog such as 66 and 176 (FIGS. 2 and 3A) to drive the molds as will be explained presently.

It will be apparent then that the T-shaped projections carry substantially all the driving forces and the molds are easily removable from the machine by simply sliding them horizontally out of the fill section elevator yokes.

FILLER SECTION

The filler section 20, best seen in FIGS. 2 and 4, includes side plates 68 between which the filler 22 is supported. The empty mold elevator 40 comprises a pair of side chains 70 that mount multiple mold carrying yokes 72. Each of the chains is supported on the top by a sprocket 74 secured to a stub shaft 76 that is rotatably mounted in a bearing 78 on each side plate 68. At the lower end of elevator 40, the side chains 70 are passed around sprockets 80 which are attached to a cross-shaft 82 that extends between the side plates 68 and is rotatably mounted therebetween by means of bearings 84.

Spaced forwardly from the empty mold elevator 40 and the filler 22 is the filled mold lowerator 29. The lowerator 29 is similar in construction to the previously described elevator 40 and includes side chains 86 having multiple yokes 88. Stub shafts 90, mounted on the side plates 68 by bearing 92 rotatably support the upper sprockets 94, while a cross-shaft 96, supported in bearings 98, carries the lower sprockets 100.

In order to drive the elevator 40 and lowerator 29 in unison and in an intermittent step-wise manner, a ratchet drive generally indicated at 102 (shown in FIG. 12 and in phantom line in FIG. 2) is employed to drive a chain 104 trained about drive sprockets 106 and 108 attached to the outer ends of the elevator and lowerator cross-shafts 82 and 96. The ratchet drive mechanism comprises a disc 110 and an attached drive sprocket 112 rotatably mounted on a stub shaft 114 attached to the side plate 68. Also mounted on stub shaft 114 is a swingable link 116 that includes a pivoted ratchet 118 whose downward movement is limited to a stop 119. This ratchet is notched at its outer end to engage one of several drive pins 120 on disc 110 as seen in FIGS. 2 and 12. A pneumatic cylinder 122 mounted on side plate 68 is attached to the outer end of the swingable link 116 by means of a clevis 124.

Extension of the pneumatic cylinder 122 causes the ratchet 118 to engage one of the drive pins 120 and rotate the disc 110 and attached drive sprocket 90° in the counterclockwise direction indicated by arrow 126 in FIG. 2. When the cylinder 122 is retracted the ratchet 118 is free to pivot upwardly to clear the next drive pin 120 that has rotated into position to be engaged by the ratchet 118 on the next driving stroke. A pilot valve 130 is employed to sense the extended position (not shown) of the pneumatic cylinder 122 and its function will be described later with reference to the pneumatic schematic of FIG. 17.

Referring to FIG. 2, it is to be noted that one stroke of the ratcheting drive 102 is effective to advance the empty mold elevator chain 70 an amount equal to the spacing between the yokes and advance the filled mold lowerator chain 86 an equal amount, approximately 8 inches. This motion raises a mold 24 from position A to position B where the mold is at the level of a pair of guide rails 132. These rails are supported from the side plates 68 by means of brackets 134 and serve to support the molds during filling.

From position B the mold is advanced 6 inches to position C by means of an advancing mechanism 136. The advancing mechanism 136 shown in FIGS. 2 and 4 comprises a pair of levers 138,140 externally secured at their lower ends to the external ends of a shaft 142 that extends through and is rotatably mounted between side plates 68. A pneumatic cylinder 144, mounted on the right side plate (FIG. 4) is attached centrally to the lever 138 by means of a clevis connection 146. The upper ends of levers 138 and 140 are slotted to slidably receive bolts 148 to form a driving connection with brackets 150 that extend around the forward edge of side plates 168 and are attached to pusher rods 152.

These pusher rods are retained for horizontal sliding motion by means of supports 154 attached to the interior side plate 68. Each of the pusher rods 152 include a pair of spaced collars 156 from which pusher dogs 66 previously described are pivotally mounted. The pusher dogs are so spaced on the push rods 152 such that when air cylinder 144 is actuated the rearmost pusher is effective to push a mold from the yoke 72 at the level of the guide rails 132, onto the guide rails into position C.

When a mold is pushed from position B to position C, the mold previously located in position C is pushed forwardly into position D beneath the filler 22. Simultaneously, the mold in position D beneath the filler is engaged by the pusher 66 and moved along the guide rails 132 into a yoke 88 (position E) on the filled mold lowerator. The next stroke of air cylinder 122 is effective to raise a new mold from position A to position B while the filled mold in position E in the fill mold lowerator is simultaneously lowered to a position F in the receiving end of the freezing tank 30.

The manner in which a mold is deposited in the brine or freezing tank 30 is best seen with reference to FIGS. 5 and 6. The freezing tank has a sidewall 156 which protrudes above the molds 24 and extends outwardly at 158 and then downwardly at 160 forming a box like section that is attached to the sidewall 68 to support the tank. A recess is formed in the corner portions of the tank by walls 162 and 164 in order to provide clearance for the lowerator yokes 88.

When the molds 24 have been lowered to the position F, their T-shpaed end projections 58 rest on ways 166 mounted on the inside of the recessed side wall 164 while still being retained within the cross slots 168 of the yokes 88. In order to advance the mold from the position F where it is still retained within the lowerator yokes 88 to a position further advanced in the brine tank indicated at G, the advancing mechanism 136 previously described further includes a pair of push rods 170 each of which is attached to the levers 138 and 140 by means of a clevis (FIG. 2). These push rods 170 are attached to frame works 172, best seen in FIGS. 4, 5 and 6, that in turn are attached to the rectangular pusher bars 174 that extend longitudinally along the entire length of the brine tank 30. These pusher bars 174 include multiple pusher dogs 176 spaced along their length as required to engage the T-shaped projections 58 for advancing them longitudinally in the brine tank.

As seen in FIGS. 3 and 3A the pusher dogs 176 are pivotally mounted within a slot 177 in the pusher bar 174 having a forwardly sloped surface 178 and a vertical rear surface 179 by means of a pin 180. When the pusher bar is moved to the right in retraction, the dog 176 is able to pivot upwardly, to the position shown in broken line in FIG. 3A, to ride over the T-shaped extensions 58. On the forward or driving stroke, the dog 176 abuts against the rear vertical wall 179, thereby driving the molds 24 forwardly by engaging the T-shaped projections.

Referring to FIG. 5 where one of the pusher bars 174 is shown in the retracted or rearward position, it is to be noted that the rearward surface 181 of the pusher bar is slightly forward of the rear surface of the mold 24 and its T-shaped side projections 58 (the mold being in position F) so that when the pusher bar 174 moves forwardly, thereby advancing the mold in position F to position G there is sufficient clearance behind the rear surface 181 of the pusher bar 174 so that the next mold descending from position F does not interfer with the pusher bar when it is lowered from position E. The pusher bar 174 is supported for horizontal reciprocating motion by means of bracket members 182 and 183 that are bolted together and mounted on the outwardly extending brine tank side wall 158. The inward portion of the bracket includes a tubular section 184 having a bushing 186 (FIG. 3) therein for slidably receiving and supporting the guide rod 188. The pusher bar 174 is suspended from a guide rod 188 by means of blocks 190 welded to either end thereof and bolted to the pusher bar 174 as best seen in FIGS. 2 and 5.

The reciprocating action of air cylinder 144 therefore is also effective to horizontally reciprocate the pusher bar 174 in unison with the reciprocation of pusher rod 152 previously described. The action of pusher bar 174 and its pushers 176 is effective to advance the molds 24 through the brine tank in a step wise motion. The molds are effective to push each other due to the abutment of the T-shaped end projection of the molds indicated at 58 (FIG. 5). The guide rail 166 in the initial portion of the brine tank is in alignment with a similar but wider rail guide 192 (FIG. 3) that is effective to support the T-shaped end projections of the molds once the molds have passed the recessed area in the front of the tank defined by walls 162 and 164.

Located above the guide way 192, as seen in FIGS. 2 and 3 is a restraining bar 194 which is effective to prevent buckling up of the molds as they push each other along the lower guide rail 192. Similar guide bars 188 and their associated mounting may be provided along the length of the pusher bars 174 as required to support and guide the pusher bar along the length of the brine or freezing tank 30. The reciprocating action of the pusher bar 174 and its associated pushers 176, is effective to advance the molds through the freezing tank in a timed step-wise motion each step being equivalent to the width of one mold, i.e., approximately 2 ¼ inches, an amount somewhat greater than the mold width. As the molds progress through the freezing tank, the product within the mold slowly solidifies. Upon reaching the stick inserter 32, (FIG. 1), sticks are inserted in each of the cavities of the mold and the molds progress toward the front of the freezing tank at which time the product in the molds is solidly frozen.

Upon reaching the end of the guide rails 192 the mold in position H is pushed off the end of the guide rail 192 into the cross slot of a yoke 196 on the filled mold elevator 33 as seen in FIGS. 7, 8 and 9. The elevator 33 is of substantially identical construction to the filled mold lowerator 29 previously described and is effective to elevate the filled mold from the position I to a position J at the elevation of extractor section guide rails 198.

EXTRACTOR SECTION

The purpose of the extractor section, generally indicated at 34 in FIG. 7, is to remove the frozen product from the molds and deliver the frozen product to further processing steps and eventually to a bagging station indicated at 50 in FIG. 1. The extractor section comprises an advancing mechanism generally indicated at 200 and the extractor bar elevator-lowerator generally indicated at 42.

One of the purposes of the advancing mechanism 200 is to remove the filled molds from the yokes 196 of the fill mold elevator 33 and advance them along guide rails 198 through the extractor section and to the empty mold lowerator 36. As seen in FIGS. 7, 10, and 13, pairs of levers 202 and 204 are located on the exterior of side plates 68. These levers 202 are attached to a transversely extending shaft 206 rotatably supported in the side plates 68 on bearings 208 while levers 204 (FIG. 13) are supported on stub shafts and bearings indicated at 209.

A rectangular frame 210 formed of square bar stock is oriented horizontally and lies in a horizontal plane partially outside the side plates 68. Transversely extending cross bars 212 and 214 extend through the side plates through openings indicated at 216 and 218. The front cross bar 212 is supported from the levers 202 by means of pin projections 220 that extend through and are free to ride up and down in slots in the lower ends of the levers 202 (not shown). The frame 210 is supported for longitudinal reciprocating motion by means of rectangular bearing supports 222 attached to the exterior side plates 68 as seen in FIGS. 10 and 15. A pair of pusher mounting bars 224 are secured to the front cross bar 212 and project inwardly of the frame 210 inside of the side plates 68. A pusher dog 226, similar to those previously employed in the filler section 20, is mounted approximately 6 inches to the right of an amount equivalent to the width of three molds, the end surface of the pusher mounting bar indicated at 228 (FIG. 7) formed by a downward extension of the inner end of the pusher mounting bar 224. Another pair of inwardly directed pusher mounting bars 230 are attached to the rear cross bar 214, upon which pusher dogs 232 are mounted. An air cylinder 234 is attached to one of the side plates 68 and is connected to the lever 202 by means of a clevis 236 (FIG. 7) to actuate both levers 202 and 204 through the connecting drive shaft 206, thereby horizontally reciprocating the previously described frame 210 and its associated pushers. A pair of pilot valves 238 and 240 (FIG. 7) are attached to the side plates 68 in positions to sense the position of the pushers in either their forward or rearward extreme position through position of the lever 202.

The extractor bar elevator-lowerator 42 (FIG. 7) of similar construction to the previously described elevators and lowerators and comprises pairs of upper and lower sprockets 242, 244, respectively, that carry side chains 246 which have yokes or mold bar receivers 248 thereon. The upper sprockets 242 are secured to a drive shaft 250 that extends between side plates 68 and is rotatably mounted between the side plates by means of bearings 252. The lower sprockets 244 are similarly mounted on an idler shaft 254 also rotatably mounted between the side plate 68.

One end of the drive shaft 250 extends through the side plate 68 and is connected to a ratchet drive generally indicated at 256 (FIG. 7). This ratchet drive mechanism is identical to the ratchet drive mechanism 102 previously described in the filler section and is driven by means of an air cylinder 258. A pilot valve 260 is provided to sense the extended position of air cylinder 258. Actuation of air cylinder 258 causes the ratcheting mechanism 256 to advance the extractor bar lowerator-elevator 42 in an intermittent step wise manner in the direction indicated by arrow 264. The purpose of the extractor bar lowerator-elevator 42 is to insert the extractor bars 44 over the sticks 32 projecting upwardly from the frozen product within the mold so that the extractor bar grips the sticks. One actuation of cylinder 258 is effective to lower an extractor bar from the position indicated at AA to the position BB where the sticks 32 are gripped by the extractor bar. Simultaneous to this operation the extractor bar indicated at DD is raised to position EE to effect removal of the frozen product from the mold in position N and support the frozen product suspended from the stick 32.

Upon actuation of air cylinder 234, the advancing mechanism 200 causes the pusher frame 210 to be advanced from the position shown in FIG. 7. During such advancement, the pushers 226 engage the mold shown in position J and push the mold out of the filled mold elevator yokes 196 onto the extractor section guide rails 198. Simultaneous with this, the stroke of the pusher frame, as previously mentioned, is equal to the width of three molds and therefore mold J is advanced to the position indicated at K. Also simultaneously, the forward end portions 228 of the pusher mounting bars 224, spaced the width of two molds from position BB, are effective to engage the forward edge of the extractor bars 44. It can be seen that as mold J is advanced into position K the molds located forwardly thereof will also be advanced causing the advancement of the mold in position L. During the last two inches of the pusher frame stroke, mold J effects advancement of mold L through contact with the intermediate molds, while the end face of the pusher bar 228 simultaneously engages the forward edge of the extractor bar 44 so that the extractor bar and the mold L are simultaneously advanced from positions BB to CC and L to M, respectively. This prevents any possible tipping action due to any friction or binding between the extractor bars 44 and their carrying yokes 248.

When the mold and extractor bar are in position N and DD, the mold is subjected to a defrosting spray 269 (FIG. 7) from beneath. The purpose of this spray is to warm the mold sufficiently so that any bond between the frozen product and the mold, due to freezing, is broken permitting extraction of frozen product. The spray defroster is effective to spray warm water around the molds. This spray defrost forms the subject of a copending United States application to John S. Brown, Ser. No. 85,004 filed Oct. 29, 1970.

In position DD, the extractor bar 44 is again received between a pair of elevator lowerator yokes 248. Upon actuation of the extractor bar elevator-lowerator 42 during the period in the step wise motion of the molds when they are at rest, it can be seen that the advancement of the elevator lowerator 42 is effective to raise the defrosted product from the mold by means of the sticks 32 which are gripped by the extractor bars into the position indicated at EE. The now empty mold in position N is advanced to position O by further actuations of the advancing mechanism 200. From the position O, the pusher dog 232 is effective to advance the mold off the end of the extractor section guide rails 198 to position P where the mold is supported between yokes 268 of the empty mold lowerator 36.

The construction and mounting of the empty mold lowerator generally indicated at 36 is substantially identical to the previously described empty mold elevator 40. An important feature of the elevators 40 and 33 as well as lowerators 29 and 36, is that the spacing of their mold carrying yokes is approximately 8 inches compared to a zero inch spacing of the molds in the freezing tank 28. This spacing affects a substantial reduction in the number of molds with an attendant cost savings.

Both the filled mold elevator 33 and the empty mold lowerator 36 are driven in an interrupted step wise manner by means of a ratchet drive 270 and drive chain arrangement 272 also substantially identical to the ratchet drive 102 and drive chain 104 described in connection with the filler section 20. This ratchet drive mechanism 270 is driven by means of an air cylinder 274 between advanced and retracted positions. The advanced position is sensed by a pilot valve 276.

Curved restraining guides 280 secured to the side plates 68 are provided in order to prevent the molds from slipping out of their yokes 268 as they pass around the lower end of the empty mold lowerator, such as at position Q.

RETURN AND WASH SECTION

MOLD RETURN SECTION

The purpose of the mold return section is to transfer the empty molds from the lowerator 36, advance them through the wash section where the molds are washed and rinsed, and continue to advance the molds to the filler section mold elevator 40. One of the important advantages of the empty mold return section is that the molds are advanced in a widely spaced relationship, each mold being advanced by a separate pair of pusher dogs, and not by edge-to-edge abutting pushing motion such as used through the freezing tank. This feature has the important advantage that the number of molds, which are quite expensive, employed in the freezing machine is considerably reduced over the type in which the molds are permanently affixed to the advancing chain and between which the spacing cannot be varied. The greater spacing of the molds in the return section permits a reduction in number of molds in the apparatus of approximately 30 to 40 per cent providing substantial savings in mold investment, especially where several sets of molds of different types and sizes are used with the same apparatus.

A pair of pusher rods 282 (FIGS. 1 and 7) (only one being shown) extend longitudinally along the lower portion of the apparatus. These pusher bars are reciprocated longitudinally by means of a lever 284 pivoted from the side frame 68 at its upper end as indicated at 286 (FIG. 1). The lever 284 is actuated by means of a pneumatic cylinder 288 mounted on the side plate 68 and attached to the lever 284 by means of a clevis connection 290. The pusher rod 282 is attached to the lower end of lever 284 by means of a pin 292 received in a slot 294 in the lever. Pilot valves indicated at 296 and 298 sense the fully extended and retracted positions of the lever arm 284 as will be described with respect to the pneumatic schematic of FIG. 17.

Referring now to the lower portion of FIG. 7 and the perspective of FIG. 11, the pusher rod construction will now be described. The forward portion of each pusher rod 282 is guided and supported in a position adjacent to the machine side frame 68 by means of a guide 300. This portion of the push rod is maintained in close proximity to the side wall of the machine so that the lowerator 36 with the mold carrying yokes passes inside of and clears the push rod 282. However, an extension 282a of the pusher bar 282 extends forward and inside with respect to the upward return leg of the lowerator 36.

The molds 24 carried by the lowerator 36 come up underneath the pusher bar 282 and are pushed out of the yokes 268 at a point below the pusher bar 282. The pusher bar, shown in its forward or retracted position of FIG. 11, includes a dog leg or inset portion at 302, a rigid, end pusher 304, and multiple widely spaced pushers 306 similar in construction to pushers 66 described in connection with the filler section 20. The yokes 268 move in the direction of arrow 308 on the descending leg of the lowerator 36 and carry empty molds past the inside of the pusher bar portion 302. The yokes 268 on the upwardly moving or return run of the lowerator pass on the inside of the pusher bar extension 282a forwardly or to the left of the inwardly directed inset leg portion 302. After the molds have passed around the lower sprocket of the lowerator 36 from the position Q shown in FIG. 7, they are raised in an inverted orientation to the position R in FIG. 7 level with U-shaped guide channels 312 supported from the side walls 68 of the machine by means of brackets indicated at 314.

Actuation of the air cylinder 288 (FIG. 1) causes the pusher arm to move to the right thereby sliding the T-shaped projections 58 of the molds 24 out of their yokes 268 into the guide channel 312 as indicated by arrow 316.

The pusher dogs 306 are pivotally mounted on support blocks 318 that are in turn attached to the push rod 282. the downward motion of the pusher dog 306 is limited by the bottom leg of channel 312 for engagement with the T-shaped end sections of the molds 24. These pusher dogs are spaced at approximately 12 inch intervals and serve to advance the molds through the wash section at these widely spaced intervals except in the vicinity of wash and rinse nozzles as will be explained presently. the dogs 306 are free to pivot upwardly on the rearward or return stroke of the pusher arm and ride up over the T-section of the molds during retraction. In order to further guide the push rod 282, several of the mounting blocks 318 for the pushers 306 incorporate an L-shaped bracket such as shown at 320 (FIG. 11) that slides on and hooks over a guide rail 322 supported by posts 324 from the previously mentioned guide rail brackets 314.

Referring now to the lower portion of FIG. 2 showing the terminal end of the return section, actuation of the pusher bar 282 to the right will move the mold confined within the guide channel 312 from the position shown at W to the position X where the mold has been pushed off the end of the guide channel 312 into a yoke 72 of the empty mold elevator 40 of the filler section 20. Actuation of the elevator 40 in a counterclockwise direction advances the mold from the inverted position X to the upright position Y. During this motion, a restraining guide 326, identical to the guide 280 previously described, prevents the molds from slipping from their slotted yokes during the inverting operation. Further actuations of the empty mold elevator bring the mold from position Y upwardly to the position A previously described.

WASH SECTION

As the molds 24 move along the return run section that has been just described, the molds also pass through a wash section generally indicated at 38 in FIG. 1. This wash section is seen best in the schematic drawings of FIGS. 16 and 16A and comprises a pre-rinse tank 328, a wash tank 330 and an after-rinse tank 332.

Each of the previously mentioned tanks include a recirculating pump and line such as indicated at 3334 that supply spray nozzles 336 located above the molds and the additional nozzles below the molds as indicated at 338 thereby assuring complete cleaning of the molds. In order to reduce water consumption, the pre-rinse tank 328 and the after-rinse tank 332 are interconnected by means of a line 340. The pre-rinse tank 328 includes a drain line, as indicated at 342, that is located somewhat below the liquid level in the pre-rinse tank 328 for constantly draining the rinse water therefrom. Make-up water is constantly added to the after rinse tank 332 and the fluid level is maintained therein by means of a float valve (not shown). Therefore, a constant fluid flow is maintained from the after rinse tank 332 through line 340 into the pre-rinse tank 328, and the cleaner after-rinse water is employed for the pre-rinse. The wash tank 330 also contains fill and drain provisions as well as means for heating the wash water therein.

These details of construction are well known in the art and a further description is not felt to be necessary.

The mold advancing mechanism for the return section previously described advances the inverted molds in a step wise manner in approximately 12 inch steps. In order to provide a longer washing period for the molds located between the upper and lower washing spray nozzles 336 and 338 than provided by the reciprocating motion of the pusher bar 282, one of the features of the invention is to provide a dwell period enabling longer and more effective washing when the molds are in the spray areas. This dwell period is achieved by increasing the spacing between the pusher dogs 306 that are effective to advance the molds in the area of the spray nozzles. For example, if the normal spacing between the molds in the return section is nominally set at 12 inches for example, the spacing between the pusher dogs effective to advance a mold from the position U to the position V over the pre-rinse tank 328, is increased to 16 inches, assuming a nominal mold width of 2 inches. Therefore, as successive molds are pushed into the position T the mold in position T' would not be picked up by the adjacent pusher dogs 306. Therefore, when an additional mold is advanced into position T the mold in position T' is pushed to position U. Thereafter, the pusher 306 with a 16 inches spacing is effective to pick up the mold from position U and advance it to position V. The number of molds that are collected above the spray nozzles can be simply varied by increasing the spacing between the pusher dogs in multiples of the mold width. As seen in FIG. 16, four molds are collected over the after rinse tank 332 by providing an 18 inch spacing between the pusher dogs while employing a 12 inch stroke or motion on the pusher bar.

EXTRACTOR BAR ADVANCE AND RETURN SECTION

As previously described, the extractor bar lowerator-elevator 42 is effective to lower an extractor bar 44 from position AA as shown in FIG. 7 to the position BB directly above the filled mold at position L. Referring now to FIG. 14, the extractor bar 44 comprises a pair of abutting angle shaped members 344 and 346. These members are joined together at their ends to form a unitary bar which includes flat end projections 348 one of which is shown received within one of the slotted yokes 248 in FIG. 14. The angle shaped member 346 contains multiple horizontally spaced vertical grooves 350 formed between the abutting faces of the angles 344 and 346 to receive sticks 32 which are embedded in the frozen confections. These angle members further include beveled surfaces 354 and 356 to guide the sticks 32 into the stick receiving grooves 350. The extractor bar is lowered into stick engaging position BB of FIG. 7 to grasp the sticks 32 so that the frozen confection can be withdrawn from the molds, as previously described at position DD. A spring clip 358 is bolted to the angle 356 adjacent each groove 350. The spring clip further includes a beveled or sharpened edge 360 which normally abuts the upwardly directed length of angle 344. When the stick is inserted upwardly through the groove 350, due to the downward motion of the extractor bar 44, the spring clip is forced away from the angle 344 by the stick 32. The downward withdrawal of the stick 32 is prevented by the sharpened bevel edge 360 which is spring loaded against the stick and thereby holds the stick until such time as the spring clip 358 is positively released. The spring clip 358 further includes an integral release lever 364 that projects above the angle member 344. When it is desired to release the frozen confection from the extractor bar 44, such as at the bagging station 50 indicated in FIG. 1, a release bar 366 is mounted between the side plates 68 in a position extending across the path of the extractor bars and located immediately above the upper portion of the angle members 344 of the extractor bar 44 as seen in FIG. 13. As the extractor bars 44 are advanced, the release levers 364 which are integrally formed with the previously described spring clips 358 and which project above the extractor bar 44 engage the release bar 366. The forward motion of the extractor bar causes the release bar 366 to push the release levers 364 and their associated spring clips 358 rearwardly as shown by arrow 368 thereby releasing the sticks 32 from the grooves 350 in the extractor bar permitting the frozen confections to drop therefrom. During their forward motion, the extractor bars 44 are carried between channel shaped guide rails 370 as best seen in FIGS. 13 and 14. These channel shaped guide rails are supported from the side plates of the machine 68 by means of brackets indicated at 372.

The extractor bars are advanced by means of the pusher mechanism 200 previously described in connection with the extractor section. In addition to the portion of the advancing mechamism previously described, a push rod 374 best seen in FIGS. 7 and 15, is pivotally attached to the lever 202 by means of a clevis connection 376 located exteriorly of the side plates 68 as seen in FIG. 10 and extends forwardly to the vicinity of an aperture 378 in the side plate where an extension bar 380 projects inwardly through the side plates. Referring now to FIG. 14, the extension bar 380 incorporates a rigid pusher dog 382 that is effective to engage an extractor bar in the position indicated at EE and upon actuation of the advancing mechanism 200 is effective to push the extractor bar forwardly, as indicated by the arrow 384, out of the extractor bar elevator lowerator yokes 248 into the guide channels 370. Subsequent actuation of the advancing mechanism 200 and the extractor bar elevator lowerator serve to move additional extractor bars 44 into the position EE where they are thereafter pushed into the guide channels 370. The extractor bars are advanced along the guide channels 370 by the action of the pusher dog 382. Each of the extractor bars 44 serve to push and advance the preceeding extractor bar for each forward actuation of the pusher dog 382 in the same manner that the molds 24 are advanced through the freezing tank 30. Upon reaching the bagging station, generally indicated at 50 in FIG. 1, and after the release of the frozen confections from the extractor bars 44 as previously described, the extractor bars are pushed from the ends of the guide channels 370 into yokes on the elevator generally indicated at 52, which is constructed in an identical manner to the previously described elevators and lowerators. The elevator 52 is actuated by means of an air cylinder 386 driving a ratchet mechanism 388 which is identical to the ratchet mechanism 102 described in conjunction with FIG. 2 and FIG. 12. The elevator 52 is effective to elevate the extractor bars to their return run, where the extractor bars are removed and advanced in the rearward direction as indicated by arrow 392 by means of pusher bars 390. These pusher bars 390 are actuated by means of the previously described levers 204 and are constructed as shown in FIG. 15.

Each of the pusher bars 390 include multiple widely spaced pushers 394 that are fitted within recesses 396 and mounted on pivot pins 398 that extend through the pusher bar. The pusher bar is driven by means of a drive bar 400 which is connected to the pusher bar by means of transverse attachment bars 402 that extend through appropriate apertures in the side plate 68. It is to be noted that the drive bar 400 is located on the outside of the sideplate 68 and is supported by means of bushings mounted on the exterior of the side plate as indicated at 404. The drive bar is actuated by means of a pin connection 406 similar to the one shown at the lower end of the lever 204. As a result, the extractor return pusher bar 390 operate in unison with the previously described frame 210 and is also actuated by the advancing mechanism 200.

PNEUMATIC SYSTEM

The pneumatic system and its operation will now be described with reference to the schematics of FIGS. 1 and 17. The pneumatic system for the frozen confection machine of the present invention basically comprises two sets of actuating cylinders. The set of actuating cylinders shown in the right hand portion of FIG. 17 and numbered 144, 234, and 288 provide horizontal actuation of the advancement mechanisms, which in turn cause horizontal translation of the molds through the machine. On the left portion of FIG. 17, the series of four actuating cylinders 122, 258, 274, and 386, are effective to operate the various mold elevators and lowerators. Each of the horizontal motion actuating cylinders are in addition arranged to operate pilot valves which are actuated by the hydraulic cylinders when either in fully extended or retracted positions. In contrast however, the cylinders for operating the various mold elevators and lowerators are effective only to actuate a single pilot valve upon either full extension, as with cylinders 122, 258 and 274, or upon full retraction as with cylinder 386.

These two sets of cylinders with their respective pilot valves and additional slave valves to be described presently provide an intermittent step wise motion alternating in the vertical and horizontal direction whereby the molds are first advanced or returned in a horizontal plane and subsequently are either elevated or lowered in a vertical plane prior to the next advancement or retraction of the molds.

Referring now to FIG. 17, air is supplied to the pneumatic system of the present invention by means of a supply line 414. A gate valve 416 is used to shut off air for the entire system when desired and a main air supply line 418 extends from the gate valve 416 to a pilot valve 410 through an on-off value 428. A dual directional pressure operated slave valve 420 is connected in the manner shown, to the line 418 via a line 422. When the slave valve 420 has its piston member 421 in the right hand position as shown in FIG. 17, the air from line 422 is passed through the valve and into a line 424 which supplies air under pressure to the extension cavities of cylinders 144 and 234 and the retraction cavity of the air cylinder 288. The extension cavity of cylinder 288, as well as the retraction cavities of cylinders 234 and 144, are connected to the slave valve 420 through a line 426 which is vented to the atmosphere through the slave valve 420.

When the pneumatic cylinder 144 is fully extended as shown in FIG. 17, a spring return pilot valve 410 is moved to the actuated position as shown. Similarly, identical pilot valves 238 and 296, which are in series connection with the valve 410, are also actuated by their respective cylinders 234 and 288. Air then passes from the air supply line 418, through an on-off valve 428, through these pilot valves into a line 430 which leads to the right side of slave valve 420 and is effective to shift the piston to the left thereby reversing the horizontal actuating cylinders 144, 234, and 288. As these cylinders retract, pilot valves 410, 238 and 296 move to the closed position, cutting off the air pressure in line 430.

Upon complete reversal of these cylinders, the series connected pilot valves 408, 240, and 298 are actuated such that air from the main line 418 passes through a branch line 432, through the pilot valves and into a line 434 leading to the left side of a slave valve 436 which controls the elevator-lowerator operating cylinders 122, 258, 274 and 386.

Before air is admitted to line 434, the slave valve 436 has its piston positioned to the left and consequently the elevator-lowerator operating cylinders and their associated pilot valves are in the positions as shown in FIG. 17. In this position, air from the main line 418 is supplied to the slave valve by a branch line 438 and from the valve to the retraction cavities of cylinders 122, 258, and 274 as well as the extension cavity of cylinder 386 via a line 440. Air pressure in line 434 causes the piston of valve 436 to shift to the right, reversing the cylinders by directing air pressure to the extension cacities of cylinders 122, 258, 274 and the retraction cacity of cylinder 386 via a line 442.

Upon complete extension of cylinders 122, 258, 274 and retraction of cylinder 386, all of the series connected pilot valves 130, 260, 276, and 412 are actuated permitting air to flow from the main line 418, through a branch line 444 and these pilot valves into a dual branched slave operating line 446. Pressure in line 446 causes the piston of slave valve 436 to shift back to the left, immediately reversing the elevator-lowerator actuating cylinders while simultaneously causing the piston of slave valve 420 to shift to the right thereby reversing the horizontal actuating cylinders.

As long as valve 428 remains open the machine continues to cycle alternately between horizontal actuating strokes provided by the air cylinders 144, 234 and 288 with vertical motions produced by the various elevators and lowerators through the air cylinders 122, 258, 274 and 386. It is to be noted, however, that upon closing of valve 428, the pneumatic system cycle will continue until all of the components reach the positions as shown in FIG. 17 and further motion will cease until the valve 428 is again reopened.

In order to individually control the speed of extension and retraction of each of the pneumatic cylinders, adjustable speed control units, well known in the art, are inserted in the air line where they connect to the extension and retraction cavity of each cylinder.

Although the best mode contemplated for carrying out the present invention has been herein shown and described, it will be apparent that modification and variation may be made without departing from what is regarded to be the subject matter of the invention.

We claim:

1. Freeze molding apparatus comprising a freezing tank, means for intermittently advancing a line of independent filled molds through said tank, means for simultaneously introducing a filled mold into one end of the tank and removing a frozen product mold from the other end, means for intermittently advancing a line of frozen product molds removed from the tank along an extraction path, means for applying an extractor bar to molds along said extraction path, means for simultaneously removing an extractor bar and the frozen product at a point that is farther along said path, and means rendering said intermittent advancing means for both the molds in the tank and along the extraction path simultaneous in operation.

2. The apparatus of claim 1, wherein said molds are independent of one another and not secured to a chain or the like, a mold filler is disposed at said one end of the tank; and wherein means are provided for returning molds along a path leading from said extraction path to the mold filler.

3. The apparatus of claim 2, wherein said means for advancing the molds through said tank advances them in substantially edge to edge relation, and wherein said mold returns means substantially increases the center to center spacing of the molds.

4. The apparatus of claim 3, wherein a wash station is provided along said mold return path, and means are provided for bunching up the molds at various positions in said wash station.

5. Apparatus for performing a freeze molding operation on food products or the like having projecting sticks, said apparatus having elongated freezing and extraction stations; the improvement wherein said stations have side rails, a line of molds formed in transverse, non-connected rows depending from mold bars the ends of which are supported on said rails, means for intermittently advancing the rows of molds through said stations, said extractor means comprising an endless extractor bar conveyor having a descending reach adjacent said freezing station and an ascending reach at said extraction station, said extractor bar conveyor having receivers spaced therealong for slidably receiving and supporting extractor bars, means for sliding extractor bars into said receivers at a position above said extraction station, means for indexing said extractor bar conveyor to position a receiver on each vertical reach of the extractor bar conveyor at said extraction station side rails thereby applying an extractor bar to a row of molds at said descending reach, means for sliding extractor mold bars through a receiver on the descending reach and sliding a mold bar into a receiver on the ascending reach at the extraction station, the indexing of said extractor conveyor also lifting the extractor bar previously slid into a receiver on its ascending reach for extracting mold bar and the frozen defrosted products from the molds at said extraction station.

6. The apparatus of claim 5, comprising product removal side rails above said extraction station side rails and leading away from the ascending reach of said extractor bar conveyor, and means for sliding the extractor bars that supports the frozen defrosted products out of receivers on the ascending reach of said extractor bar conveyor onto said product removal side rails.

7. Freeze molding apparatus of the type comprising a freezing tank, transverse rows of molds, means for filling empty molds at one end of the tank, a conveyor for lowering filled molds into the tank, means for advancing a line of transverse rows of molds through the tank; and conveyors for elevating molds with frozen products from the other end of the tank; the improvement wherein said tank has side rails, said transverse rows of molds depending from mold bars that are not connected and have end portions for sliding along said side rails in edge to edge contact, said mold lowering and elevating conveyors each comprising an endless conveyor having ascending and descending reaches with receivers spaced along said conveyors for receiving the end portions of said mold bars, means for sliding the end portions of mold bars with filled molds into receivers on the descending reach of said lowering conveyor, means for indexing said lowering conveyor to bring said mold bars onto said freezing tank side rails, said means for advancing the line of molds through the tank sliding. The end portions of mold bars supporting frozen products into receivers on the ascending reach of said elevating conveyor, and means for indexing said elevating conveyor for elevating molds out of said tank.

8. Apparatus of claim 7 of the type wherein means are provided for extracting the mold bars and frozen product from the molds after they have been removed from said tank; the improvement comprising a lowerator conveyor for lowering the unconnected mold bars supporting empty molds, mold return side rails beneath said tank, said lowering conveyor including means for depositing the mold bar end portions on said mold return side rails with the molds inverted, means for advancing the mold bars with empty molds along said mold return side rails while spacing the mold bars by a distance of several inches, and an empty mold elevator for conveying empty molds from said mold return side rails vertically back to the mold filler.

* * * * *

PO-1050
(5/69)

UNITED STATES PATENT OFFICE
CERTIFICATE OF CORRECTION

Patent No. 3,763,661  Dated October 9, 1973

Inventor(s) ROBERT J. BETSCHART et al

It is certified that error appears in the above-identified patent and that said Letters Patent are hereby corrected as shown below:

Col. 3, line 18, change "baggins" to -- bagging --.
Col. 7, line 38 after "(Fig.7)" insert -- is --.
Col. 10, line 65, after "at" change "3334" to -- 334 --.

Col. 14, line 4, after "on-off" change "value" to -- valve --.
Col. 14, line 49, change "cacities" to -- cavities --.
Col. 14, line 50, change "cacity" to -- cavity --.
Col. 16, line 6, after "extractor" delete -- mold --.
Col. 16, line 7, after "sliding" delete "a mold" and insert -- an extractor --.
Col. 16, line 11, after "extracting" delete -- mold bar and --.

Signed and sealed this 28th day of January 1975.

(SEAL)
Attest:

McCOY M. GIBSON JR.
Attesting Officer

C. MARSHALL DANN
Commissioner of Patents